United States Patent
Fomin et al.

(10) Patent No.: US 10,293,432 B2
(45) Date of Patent: May 21, 2019

(54) HAND MANEUVERABLE WELDING GUN

(71) Applicants: IPG PHOTONICS CORPORATION, Oxford, MA (US); VOLKSWAGEN AKTIENGESELLSCHAFT, Wolfsburg (DE)

(72) Inventors: Valentin Fomin, Burbach (DE); Anton Starovoytov, Burbach (DE); Andrey Abramov, Burbach (DE); Valentin Gapontsev, Worcester, MA (US); Artjom Fuchs, Burbach (DE); Ingo Schramm, Burbach (DE); Eugene Shcherbakov, Burbach (DE); Holger Mamerow, Burbach (DE); Andreas Michalzik, Wolfsburg (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 109 days.

(21) Appl. No.: 14/688,555

(22) PCT Filed: Oct. 21, 2013

(86) PCT No.: PCT/US2013/065924
§ 371 (c)(1),
(2) Date: Apr. 16, 2015

(87) PCT Pub. No.: WO2014/063151
PCT Pub. Date: Apr. 24, 2014

(65) Prior Publication Data
US 2015/0266130 A1  Sep. 24, 2015

Related U.S. Application Data

(60) Provisional application No. 61/716,455, filed on Oct. 19, 2012.

(51) Int. Cl.
*B23K 26/00* (2014.01)
*B23K 26/03* (2006.01)
(Continued)

(52) U.S. Cl.
CPC ........ *B23K 26/0096* (2013.01); *B23K 26/032* (2013.01); *B23K 26/082* (2015.10); *B23K 26/142* (2015.10); *B23K 26/22* (2013.01); *B23K 26/24* (2013.01); *B23K 26/705* (2015.10)

(58) Field of Classification Search
CPC .. B23K 26/705; B23K 26/142; B23K 26/082; B23K 26/0096; B23K 26/24;
(Continued)

(56) References Cited

U.S. PATENT DOCUMENTS 3,049,607 A * 8/1962 Stuben ................. B23K 11/314
219/89
3,131,287 A * 4/1964 Goodrich ............... B23K 11/28
219/89

(Continued)

*Primary Examiner* — Tu B Hoang
*Assistant Examiner* — Vy T Nguyen
(74) *Attorney, Agent, or Firm* — Yuri Kateshov, Esq.; Timothy J. King, Esq.; Caroline Roush, Esq.

(57) ABSTRACT

A hand displaceable laser welding gun is configured with an elongated support column extending along a longitudinal axis and made from lightweight material. A support plate is displaceably mounted to the column while supporting thereon an optical head axially which is provided with optics. The optics is configured to direct a laser beam along a path towards a welding zone through a protective window of the optical head.

The laser welding gun further is structured with a first arm mounted to the support plate and extending along a longitudinal axis of the gun diametrically opposite to the optical head. The inner surface of the displaceable arm has an inner surface defining a tunnel which is aligned with the optical head and axially traversed by the laser beam, a first axially flowing stream of pressurized gaseous medium, and a sec- (Continued)

ond axially flowing stream of gaseous medium. The second stream, entering the tunnel at a pressure lower than that one of the first stream in response to a pressure gradient generated in the column, does not generate vortexes within the column.

The first and second streams exit through the downstream end of the tunnel next to the welding zone. As the streams flow out, they carry out welding debris flowing within the tunnel to the optical head.

15 Claims, 12 Drawing Sheets

(51) Int. Cl.
*B23K 26/22* (2006.01)
*B23K 26/24* (2014.01)
*B23K 26/70* (2014.01)
*B23K 26/082* (2014.01)
*B23K 26/142* (2014.01)

(58) Field of Classification Search
CPC .. B23K 26/22; B23K 26/1476; B23K 26/032; H04N 21/235; H04N 21/435; H04N 21/84; H04N 21/25808; H04N 21/25883; H04N 21/25891; H04N 21/482; H04N 21/4828; H04N 21/6582; H04N 21/85403; H04N 5/765; H04N 5/77; H04N 5/782; H04N 7/0122; H04N 9/8205; H04N 9/8227
USPC .............. 219/121, 121.63, 121.78, 137.2, 74
See application file for complete search history.

(56) References Cited

U.S. PATENT DOCUMENTS

| | | | | | |
|---|---|---|---|---|---|
| 3,135,853 | A * | 6/1964 | Goodrich | ............ | B23K 11/251 219/86.61 |
| 4,296,304 | A * | 10/1981 | Defourny | ............. | B23K 11/253 219/86.41 |
| 4,574,176 | A * | 3/1986 | Sharp | ................. | B23K 15/0053 219/121.13 |
| 4,578,554 | A * | 3/1986 | Coulter | ................. | B23K 26/042 219/121.63 |
| 5,107,100 | A * | 4/1992 | Shepard | ............. | G06K 7/10881 235/462.46 |
| 5,305,653 | A * | 4/1994 | Ohtani | ................. | B25J 17/0283 74/490.03 |
| 5,650,077 | A * | 7/1997 | Zinke | ..................... | B23K 26/03 219/121.63 |
| 6,593,544 | B2 * | 7/2003 | Remue | ................. | B23K 26/046 219/121.73 |
| 6,666,630 | B2 * | 12/2003 | Zimmermann | ........... | B23C 3/00 219/121.6 |
| 7,057,134 | B2 * | 6/2006 | Denney | ................ | B23K 26/032 219/121.68 |
| 8,766,136 | B2 * | 7/2014 | Kessler | .............. | B23K 26/0869 219/121.62 |
| 8,796,582 | B2 * | 8/2014 | Kawai | .................. | B23K 26/046 219/121.6 |
| 9,170,075 | B2 * | 10/2015 | Kangas | ................ | F41H 13/0087 |
| 2002/0082466 | A1 * | 6/2002 | Han | ........................ | A61B 18/20 600/13 |
| 2004/0026388 | A1 * | 2/2004 | Staufer | ................... | B23K 9/173 219/121.78 |
| 2007/0138150 | A1 * | 6/2007 | Gualtieri | ............ | B23K 26/0096 219/121.63 |
| 2007/0151957 | A1 * | 7/2007 | Hughes | ............... | B23K 26/0096 219/121.63 |
| 2009/0107966 | A1 * | 4/2009 | Wojcik | ............... | B23K 26/1476 219/121.72 |
| 2009/0139967 | A1 * | 6/2009 | Baker | ................. | B23K 26/0096 219/121.63 |
| 2010/0221448 | A1 * | 9/2010 | Mittendorf | ............ | C23C 24/103 427/532 |
| 2010/0332032 | A1 * | 12/2010 | Moriyama | ............. | B25J 9/1682 700/258 |

\* cited by examiner

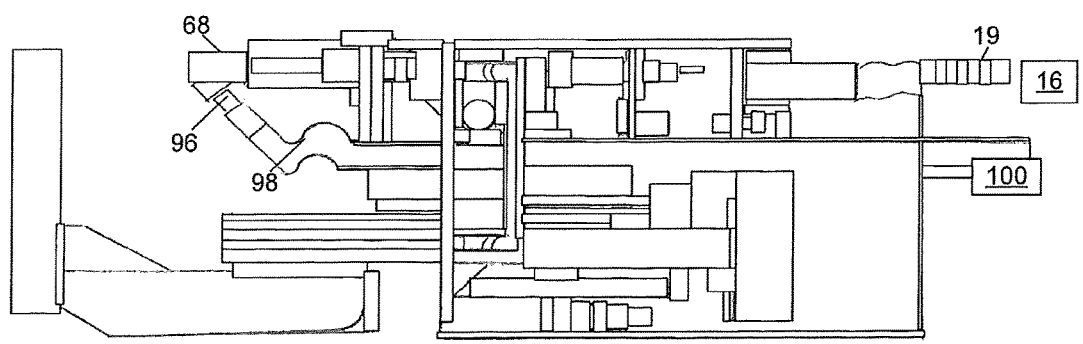
FIG. 4C
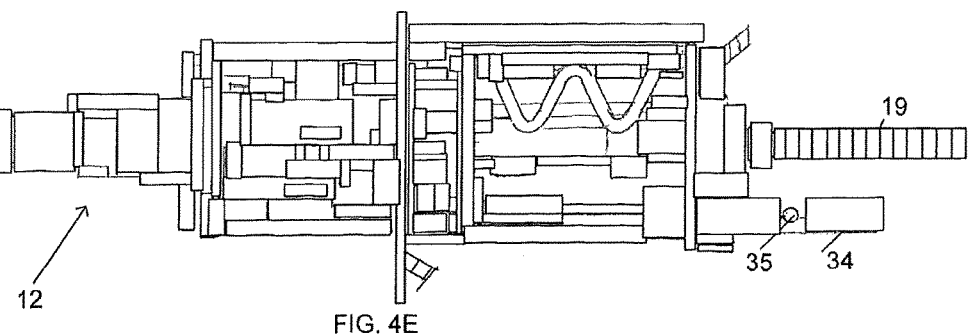
FIG. 4D
FIG. 4E

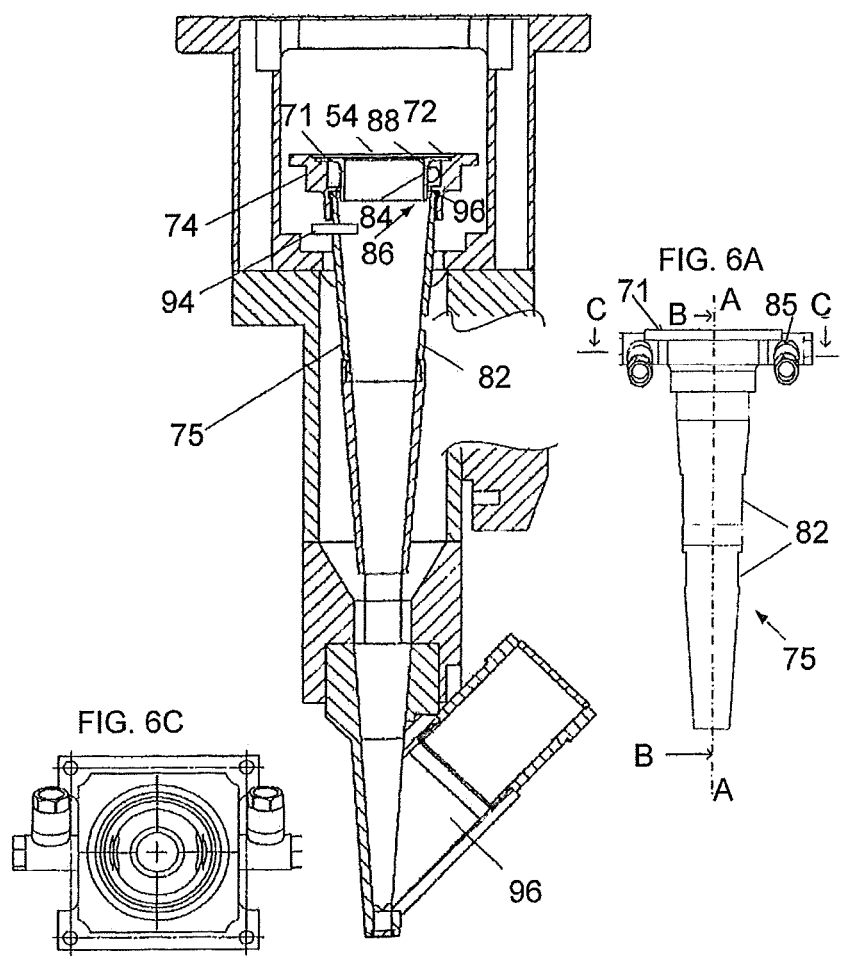

HAND MANEUVERABLE WELDING GUN

BACKGROUND OF THE DISCLOSURE

Field of the Disclosure

The disclosure relates to the field of hand-maneuverable welding guns for producing a seam weld and particularly to the hand-maneuverable welding gun provided with a fiber laser. Even more particular, the disclosure relates to the hand-maneuverable fiber welding gun configured with a robust, lightweight configuration, improved laser beam delivery system, effective welding debris-evacuating system and weld quality control system.

Prior Art

Welding is commonly employed as an assembly method for joining several metal parts or sheet materials together into an assembly. Conventional welding methods are readily available and include, for example, arc and resistant spot welding. Fairly recently laser welding has been developed and has provided several advantages over more conventional forms of welding. For example, the sharp focusing of the laser beam allows a concentration of energy capable of providing faster welding with less heat being introduced into the surrounding portions of the parts.

Precision automated or manual laser welding can be performed on industrial laser components with a high degree of accuracy, while eliminating the potential hazards of heat damage and thermal stress to complex manufacturing materials. The known laser spot welding and laser seam welding guns include high precision assemblies, pressure-sensitive hermetic assemblies, and other uniquely designed assemblies. Accordingly, the design of a laser welder is not simple and offers a few structural challenges, as discussed below.

One of these challenges includes welding of workpieces having a complicated geometry. For example, body panels of an automobile are transported to a welding station where a clamping system is imposed to hold the body panels while the welding operations are performed. Due to the configuration of some of the parts to be welded, certain clamping and welding apparatus cannot be utilized as space confines may limit the amount of space available for the necessary maneuvering and the proper functioning of the clamping and welding apparatus. To maximize productivity and efficiency, several different configurations of clamping and welding apparatus must be utilized within one welding station depending on the configuration, speed and cost of the clamping and welding apparatus. Such an approach may entail reduced efficiency and high costs.

A need therefore exists for a compact, lightweight, robust hand maneuverable laser welding gun having a configuration substantially eliminating the necessity of having multiple guns.

A further challenge is associated with laser configurations that are typically used for welding: $CO_2$ and Nd:YAG. Both laser configurations operate in the infrared region of the electromagnetic radiation spectrum, invisible to the human eye.

The Nd:YAG operates at a wavelength of about 1.06 microns. This wavelength is absorbed very well by conductive materials, with a typical reflectance of about 20 to 30 percent for most metals. On the other hand, the far infrared (10.6 micron) output wavelength of the $CO_2$ laser has an initial reflectance of about 80 percent to 90 percent for most metals but can easily supply 10,000 watts which is much greater than the highest output power of Nd:YAG lasers.

Both of the above-discussed laser types are characterized by a large physical size. For example, $CO_2$ systems can occupy an average room to achieve the high powers required. Another commonality between these laser types is the low wall plug efficiency, i.e., low energy conversion efficiency from electrical power into optical power.

Another need, therefore, exists for a laser hand maneuverable welding gun with a laser configuration having a compact and efficient structure.

Still another challenge that was presented by known robotically operated fiber laser welders relates to the impact upon the protective window of an optical head by welding debris from the welding zone which are capable of critically damaging the optics housed in the head. To cope with this problem, a pressurized jet of air is introduced into a light guiding channel downstream from the laser head at high velocities and tangentially to the longitudinal axis of the channel. Since the jet is introduced at an angle to the light propagation, it is known as a cross-jet.

The cross jet however is also associated with a few difficulties. First, because of high velocities, the cross jet forms vortexes within the channel. The vortexes in, in turn, create a pressure gradient between the central channel zone and the channel periphery. With a pressure lower in the central zone, the welding debris accumulated along this zone and damage the protective window with a relative ease. Still a further undesirable consequence of the cross-jet is that the pressure gradient negatively affects the beam. Also, the cross jet is accompanied by high noise levels.

A further need, therefore, exists for a laser head protective system that overcomes the above-discussed problems.

Still another challenge stems from the accumulation of welding debris around a welding zone and particularly in a supporting arm of known welding systems having a two-arm clamping structure. The debris accumulation is detrimental to the quality of a weld and further damages the welder's arms.

As a result, another need exists for a laser-based hand-maneuverable welding gun configured with a system for removing welding debris from the welding zone.

A further challenge is presented by the lack of control of the quality of the weld. However the weld quality is one of, if not the most important parameter of a welding process.

Accordingly, a further need exists for a laser hand-maneuverable welding gun configured with a system for automatically adjusting laser output based on the quality of the weld.

SUMMARY OF THE DISCLOSURE

Structurally, the disclosed hand-maneuverable laser welding gun is inserted within a large-size bearing and suspended on an external guide by beams of a combination of pulley assemblies. As a result, the welding gun is operable to rotate about its longitudinal axis, linearly move towards the workpieces to be welded, rotate about a vertical axis, which extends perpendicular to the longitudinal axis, and tilt about a pivoting axis extending transversely to both longitudinal and vertical axes. The disclosed gun is configured with structural components and different combinations of these components that address all of the above-discussed needs. Some of the features are briefly disclosed immediately below and, along with others, are further discussed in detail in the specific description of the disclosure.

One of the features addressing the cross jet problems includes the introduction into a light guiding channel a pressurize stream of air. The pressurized stream is forced into the channel parallel to the longitudinal axis thereof. Such a delivery technique, referred to hereinafter as an "overjet", practically eliminates the pressure gradient between central and peripheral zones. As a result, small particles or debris flowing towards the protective window of the optical head are effectively turned back by the first stream which increases the life time of the protective window and does not affect the beam quality. Furthermore, high-level noise associated with the cross jet structure is considerably reduced by using the disclosed overjet configuration.

According to another feature, in addition to the overjet, the tunnel is traversed by a second stream of air removing relatively large welding debris and flowing parallel to the overjet. A pump creating a negative pressure within the tunnel guides a great volume of ambient air at a slow speed into the upstream end of the tunnel parallel to the overjet. Since the outlet evacuating both streams from the tunnel is located close to the welding zone, the streams carry out differently sized welding debris through the outlet.

Another feature includes a high power fiber laser source emitting a laser beam guided to the gun. An optical head with a beam focusing optics, which is protected by an output protective window, is mounted to the gun and receives the laser beam which is further focused on the workpieces to be welded. Preferably, the fiber laser is utilized to output a kW-level multimode beam with a beam spot of about 500 microns. Alternatively, if necessary, a laser source may be configured to emit the beam in a substantially single mode.

In accordance with another feature, the gun is configured with a central support column extending along the longitudinal axis of the gun. Various assemblies are mounted to the support column so as to define a kinematically closed circuit in which the column receives the loads generated by these assemblies. In contrast to the known prior art, the disclosed configuration has a limited number of intermediary components between the load generated assemblies and the support. Accordingly, the disclosed gun is configured with a lightweight rigid structure.

According to another feature, one the assemblies coupled to the support includes a clamping system operative to clamp and hold the workpieces to be welded. The clamping system may have a one-arm configuration or a two-arm configuration in which one of the arms can be operatively decoupled from the support column.

Common to both configurations is a displaceable arm actuated to slide along a guide rail which is also mounted to the support column. The one arm configuration may be used when the clamping of two or more workpieces is not necessary which happens when an external holding means support the workpieces together.

Still another feature relates to the disclosed above two-arm configuration in which a stationary L-shaped arm is provided with an inner channel in which a negative pressure may be created to remove welding debris accumulated during the welding operation. Alternatively or in addition to vacuuming the channel, the lower arm may have a removable bottom allowing the operator to manually clean the accumulated debris.

In accordance with a further feature, the stationary arm is further provided with a photodetector operative to detect light leaking through the weld. Depending on the detected power of the laser emission propagating through the weld, its quality is determined and, if necessary, the laser output power is adjusted.

BRIEF DESCRIPTION OF THE DRAWINGS

The above and other features of the disclosed device will become more readily apparent from the following specific description accompanied by the drawings, in which:

FIG. 4C is one side view of the disclosed gun of FIGS. 4A-4B shown with a displaceable gripping arm which is withdrawn from a welding zone to an initial, home position;

FIG. 4D is another side view of the disclosed gun of FIGS. 4A-4B shown with both gripping arms which are brought together in a gripping welding position;

FIG. 4E is a top view of the disclosed gun of FIGS. 4A-4C;

FIG. 6A is a view of the gun with the assembled displaceable arm;

FIG. 6B is an elevated view of the arm of FIG. 6A;

FIG. 6C-6E are different sectional views of the arm;

SPECIFIC DESCRIPTION

Figure 1:
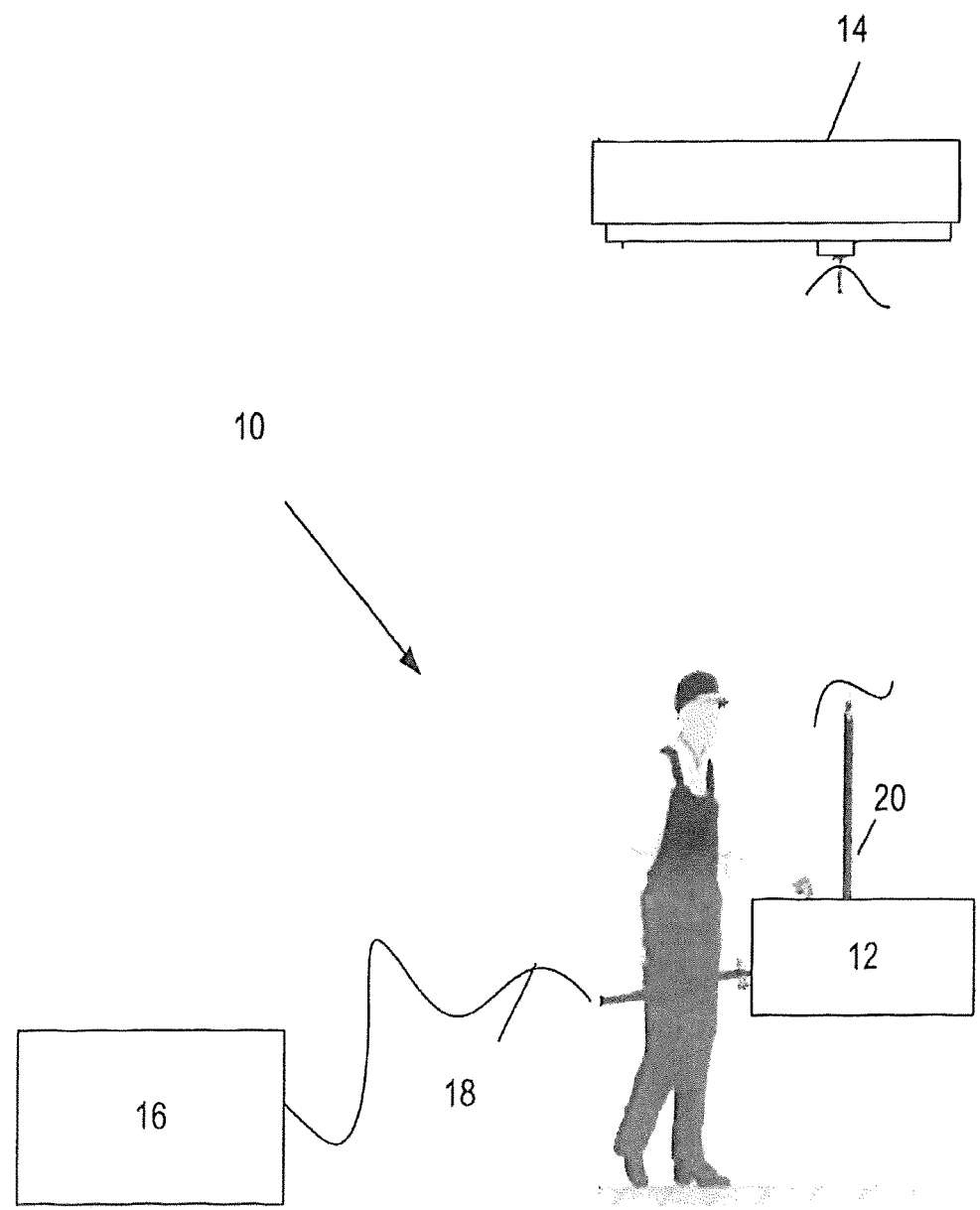
FIG. 1 is a general representation of a typical lay-out of a hand maneuverable laser welding gun.

Reference will now be made in detail to several embodiments of the disclosure that are illustrated in the accompanying drawings. Wherever possible, same or similar reference numerals are used in the drawings and the description to refer to the same or like parts or steps. The drawings are in simplified form and are not to precise scale.

FIG. 1 illustrates a general principle of operation of the disclosed hand-maneuverable laser gun system 10. The disclosed welding gun 12 is suspended on an external guide 14 by means of a gun support 20 so as to slide along an external guide in response to a force applied by the operator. Alternatively, gun support 20 may be suspended on a movable external structure delivering the gun to the desired location.

A laser system 16 is placed in any convenient location subject only to given requirements and is configured to output a high power beam, which may reach kW levels, preferably in substantially a single mode. While a high power fiber laser is preferred for reasons including high efficiency, small dimensions and high powers, laser 16 may have other, traditional configurations. A delivery fiber guides a laser beam from laser 16 to gun 12. At least part of the fiber, which goes through gun 12 to an optical laser head, is protected by a sleeve 18.

Figure 2:
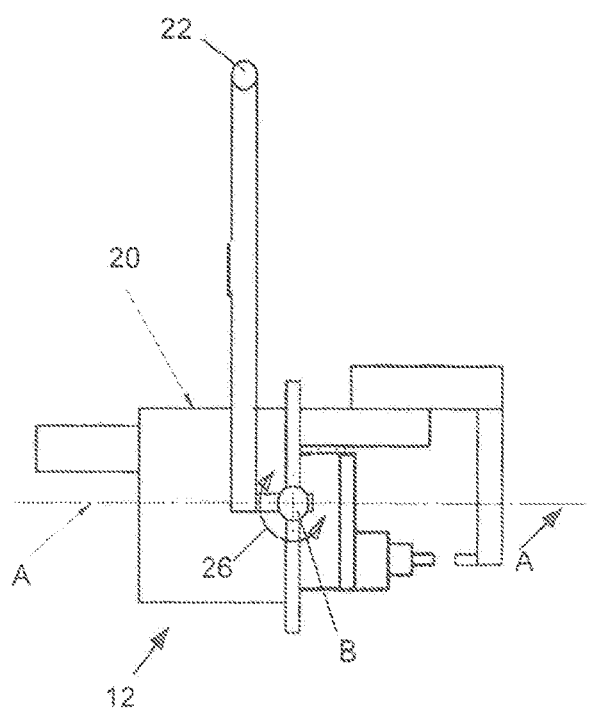
FIGS. 2 and 3 schematically show respective assemblies for displacing the disclosed laser gun in different planes.

Referring to FIG. 2, welding gun 12 may be easily maneuvered by the operator in different planes. For example, gun 12 is capable of pivoting about axis B, which extends perpendicular to a longitudinal axis A-A of gun 12, in opposite directions as indicated by double arrow 26. The pivoting is realized by a mechanism, such as a pulley 22, coupled to gun support 20.

Figure 3:
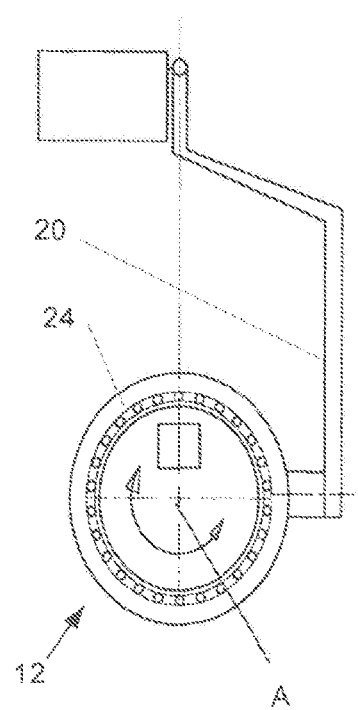

FIG. 3 illustrates a mechanism providing gun 12 with a rotational motion about its longitudinal axis A-A. The mechanism can have different configurations including, for example, a bearing 24. The bearing 24 is suspended on gun support 20 and surrounds the mid-section of gun 12 so that the entire gun rotates in response to a torque applied by the operator.

Figure 4A:
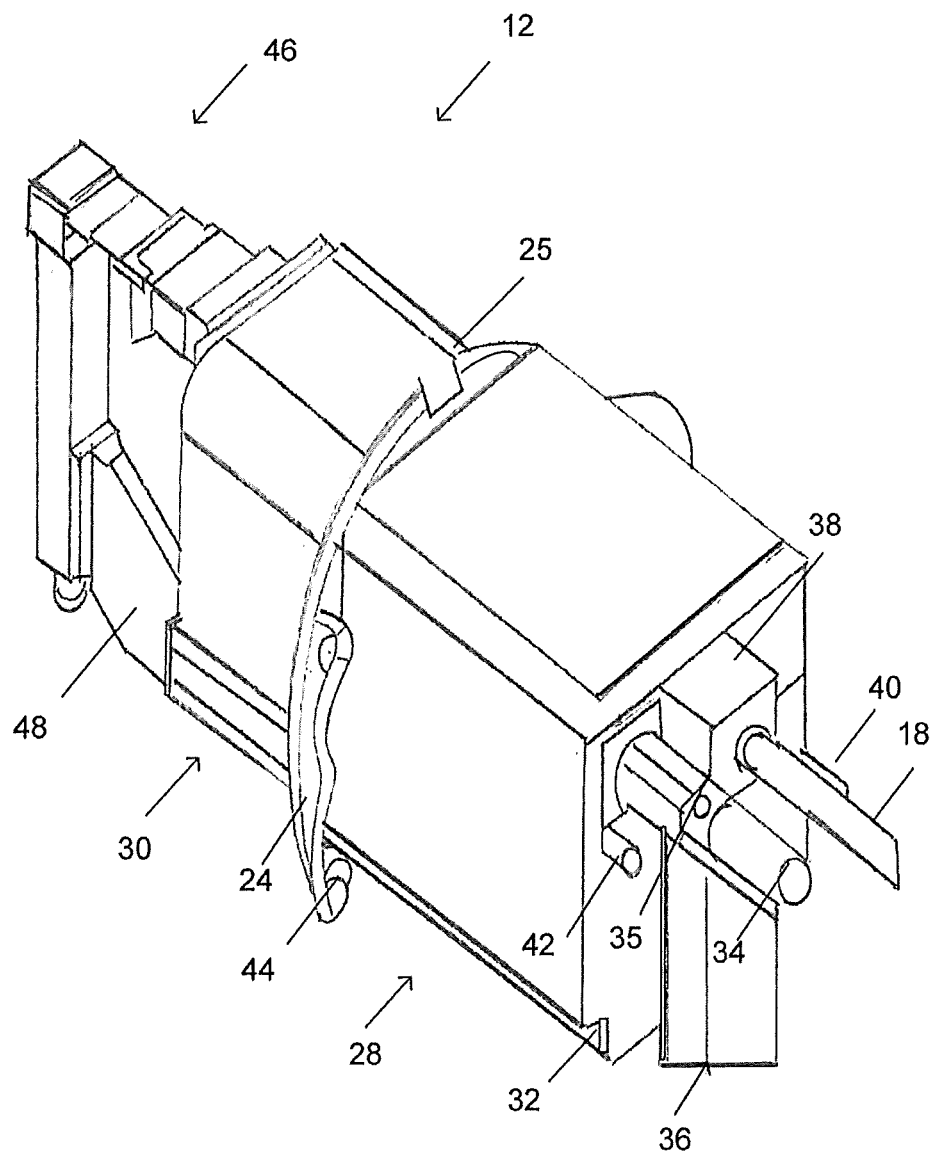
FIG. 4A is an axonometric view of the fully assembled disclosed gun.

FIGS. 4A-4E illustrate disclosed hand-maneuverable gun 12 in more detail. Referring particularly to FIG. 4A, gun 12 is configured with a housing assembly including proximal and distal housings 28 and 30, respectively. The housings can be easily disassembled and, when assembled as shown, flank bearing 24 in a manner completely isolating the operator from displaceable inner components, as discussed below.

The rear side 32 of proximal housing 28 is configured as a control panel supporting a lever 34 with a start/end welding button 35, a control electronics housing 36, a plurality of connectors coupling laser welding gun 12 to respective outside supply sources and an interface for manual introduction of the desired parameters. In particular, a connector 38 receives sleeve 18 surrounding the fiber and made from material which protects the fiber from external mechanical loads. A connector 40 engages a pipe guiding a gaseous medium under high pressure into gun 12 from an external source. A pair of connectors 42 is structured to receive respective tubes carrying cooling medium in and out of the gun. Still another connector receives an electrical power cable. The control panel is ergonomically configured to facilitate the operator to maneuver gun 12 in such a way that none of the cables and tubes interferes with the operator.

During welding, the operator engages lever 34 with one hand while holding the other hand on one of handles 44 which are mounted to bearing assembly 24. The latter has a cut-out 25 configured to couple gun 12 to gun support 20 (FIG. 2). The distal housing 30 encloses all movable parts which cannot be easily accessed by the operator. Two gripping arms—displaceable arm 46 and stationary arm 48—complete the exterior of gun 12.

Figure 4B:
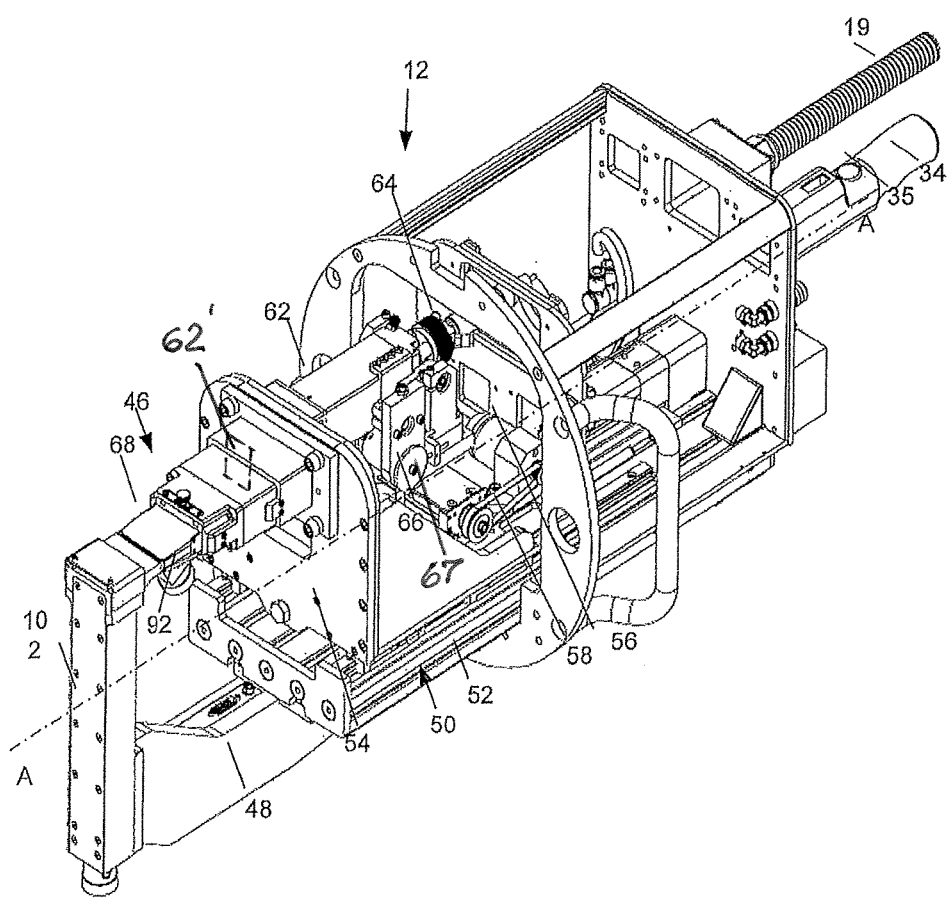
FIG. 4B is an axonometric view of the disclosed gun without a housing assembly.

FIG. 4B illustrates the interior of hand-maneuverable laser gun 12 in a closed arm position in which arm 46 is displaced next to stationary arm 48. The configuration of gun 12 is based on main support column 50 made from lightweight metal profiles that may have, for example, a hollow interior. The column 50 extends substantially over the entire length of gun 12 parallel to longitudinal axis A-A. The configuration of gun 12 allows column 50 to receive all of the loads generated by the gun's movable parts which are coupled to this column. Such a load distribution defines a closed kinematic loop in which the generated loads are closed in on the column.

The opposite elongated sides of column 50 are provided with one broad rail or a pair of separate guiding rails 52 bridged by a support plate 54 which slides along axis AA and moves arm 46 among a plurality of predetermined arm positions, as will be discussed below.

Referring briefly to FIG. 5 in combination with FIG. 4, plate 54 moves linearly along the light propagating path in response to a force generated by an electromechanical motion means which may include a motor 56 and transmission 58. Various configurations of motors and transmissions, such as belt transmissions 58 (FIG. 4B), can be used, and both components are mounted on linearly moveable plate 54. As diagrammatically shown, transmission 58 includes a piston applying a linear force to plate 54 which, in response, slides along column 50 by means of linear bearing 60 mounted on rail 52 between open and closed positions of displaceable arm (FIG. 4C and FIG. 4D, respectively). The plate 54 is part of a frame further including, among others, a pair of spaced sides 62, which preferably are configured with a triangular cross-section.

Returning to FIG. 4B, the upstream side of support plate 54 supports not only the electromechanical means, but also an optical head 62 receiving the beam delivery fiber in protective sleeve 18 by means of a connector 64. The sleeve has slack portions that tighten up as plate 54 moves toward the welding zone. With a beam spot of laser emission, delivered into laser head 62, of about 500 micron, the head 62 may be configured, for example, with an about 300 mm focal length which removes the protective window at the output of the head from the welding zone at a distance greater than that of the known prior art.

The wobbling mechanism or actuator 66 for producing a sinusoidal weld, a linear motor or actuator 67 for providing the weld with the desired length are also mounted on plate 54 along with the optical head and electromechanical means.

The opposite side of plate 54 supports displaceable arm 46 terminating with a pressure end piece 68 which is detachably mounted to the downstream of the arm. The pressure end piece 68 is structured to press against one of the workpieces to be welded and surround a laser beam such that the laser is qualified as a Class 1 laser—the safest under all conditions in the normal use. The plate 54 along with arm 46 move along multiple predetermined positions discussed immediately below.

Figure 5A:
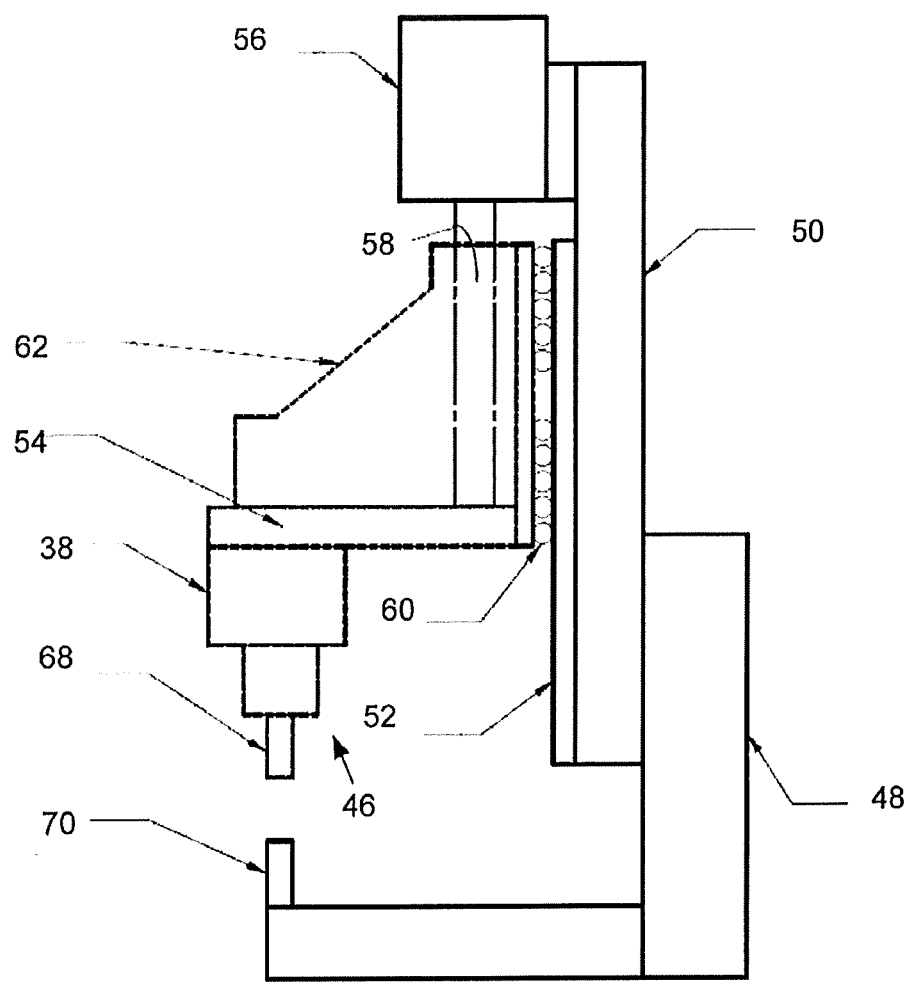
FIG. 5A is diagrammatic side view of the disclosed gun.
Figure 5B:
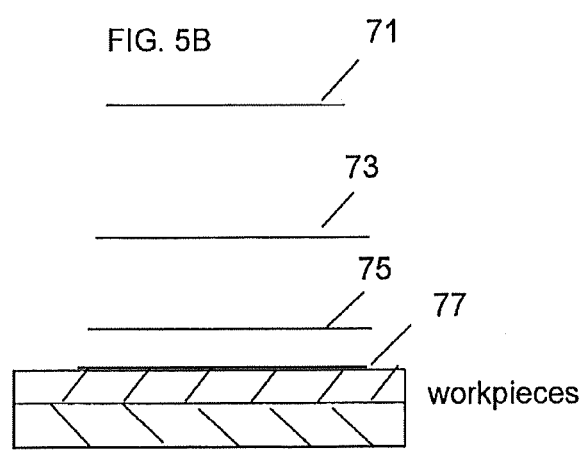
FIG. 5B is a diagrammatic view of the closed kinematic scheme of disclosed gun.

Referring to FIGS. 5A and 5B, displaceable arm 46 is initially located in home position 71 (FIGS. 5A and 5B) at a large distance from a welding zone. The operator initiates the arm displacement by pressing start button 35 (FIGS. 4B and 4E). The arm 46 is initially displaced at a first linear speed to an open position 73 and stops there at a small distance from the workpiece. The displacement of arm 46 to the position 73 is monitored and, if any object is sensed along the way, the arm is stopped, until the object is removed. The arm 46 is further displaced to a closed position 75 at a second speed lower than the first speed and stops a predetermined distance from the workpiece which is a function of the piece's thickness. Finally, the arm is displaced to a welding/gripping position 77 in which it presses against the piece with the desired pressure.

Referring to FIGS. 6A-6D, displaceable arm 46 is configured to be a multifunctional component: in addition to a gripping function, the interior of this arm serves as the guide for the laser beam and fluid flow. One of the streams of the gaseous medium is formed to prevent or at least substantially minimize exposure of the protective glass window, which is mounted to the output end of optical head 62 (FIG. 6A), from sparks and small particles or debris scattered from the welding zone in a direction counter to the light propagation direction. The other air stream, travelling parallel to the first stream at a pressure lower than that of the pressurized stream, deals with larger particles.

Turning specifically to FIGS. 6A and 6B, arm 46 is structured with a hollow elongated interior which defines a tunnel 75 extending along longitudinal axis A-A of the gun between input and output ends of arm 46. The arm includes a housing 82 capped by a flange 71 which removably couples arm 46 to support plate 54 (FIG. 6A). The housing structure may be monolithic or assembled from multiple components. For example, housing 82, as shown, includes a generally frustoconical two-part structure tapering towards a welding zone.

The flange 71, as shown in FIG. 6C, is recessed at input end 72 thereof and configured with a multi-sep peripheral wall terminating with an axially extending shoulder 74 which overlaps the upstream end (along the light and air path) of housing 82. A short T-shaped tube 86 is received in the recessed end of flange 71 and extends inwards so that it axially overlaps the upstream end of housing 82 and is spaced radially inwards from this end.

The relative position of the above-discussed housing, flange and tube defines a first relatively large annular space 88 and a relatively narrow axially extending passage 90 which opens into annular space 88 by one of its ends and into the interior of housing 82 by the other end.

The annular space 88 receives a jet of pressurized gaseous medium, such as air, through radially extending inlet 85 (FIG. 6B). As the pressurized air jet fills up space 88, it bleeds through axial passage 90 into the interior or tunnel 75 of housing 82 parallel to axis A-A. As the pressurized air flows through the tunnel, its pressure falls practically to the atmospheric pressure. The axial delivery and further flow of initially pressurized air stream along the tunnel is referred to hereinafter as an "overjet." The overjet effectively prevents small welding debris from damaging the protective glass window of optical head 62, which dramatically increases the life time of the laser head.

Referring to FIGS. 6D, and 4B-4E, the configuration of displaceable arm 46 allows creating a negative pressure in the tunnel for removing, in addition to small particles, large particles also originated in the welding zone. Such pressure can be created by using an air inlet 94 provided anywhere along the upstream region of housing 82 or even using the optical head as an air guide. This second air stream enters the tunnel, as mentioned above, at a pressure lower than that of the first stream of pressurized air and hence at low velocity. Preferably, the second stream is under the atmospheric pressure. In the end, the pressure of the second stream is so selected that air vortexes, which are typical for a pressurized cross-jet entering the tunnel at a high speed in the known devices, are eliminated.

A suction outlet 96, better seen in FIGS. 4B-4E, opens into the tunnel within housing 82 close to pressure end piece 68 (FIG. 4B) and is in fluid communication with an external negative pressure generating source 100 (FIG. 4D) through a hose 98 which creates a pressure gradient between upstream and downstream ends of tunnel 75. The second air stream under the atmospheric pressure is sucked into tunnel 75 in a volume substantially exceeding the air volume of the overjet within the tunnel. Both air streams are axially unidirectional and under substantially the same, relatively low pressure along a larger stretch of the air path along the tunnel. The overjet, slow speed and large volume of second air stream, uniform direction of both streams, in combination, practically eliminate the interference between the air streams, provide effective evacuation of small and large welding debris and do not affect the quality of the laser beam traversing the tunnel.

Figure 7A:
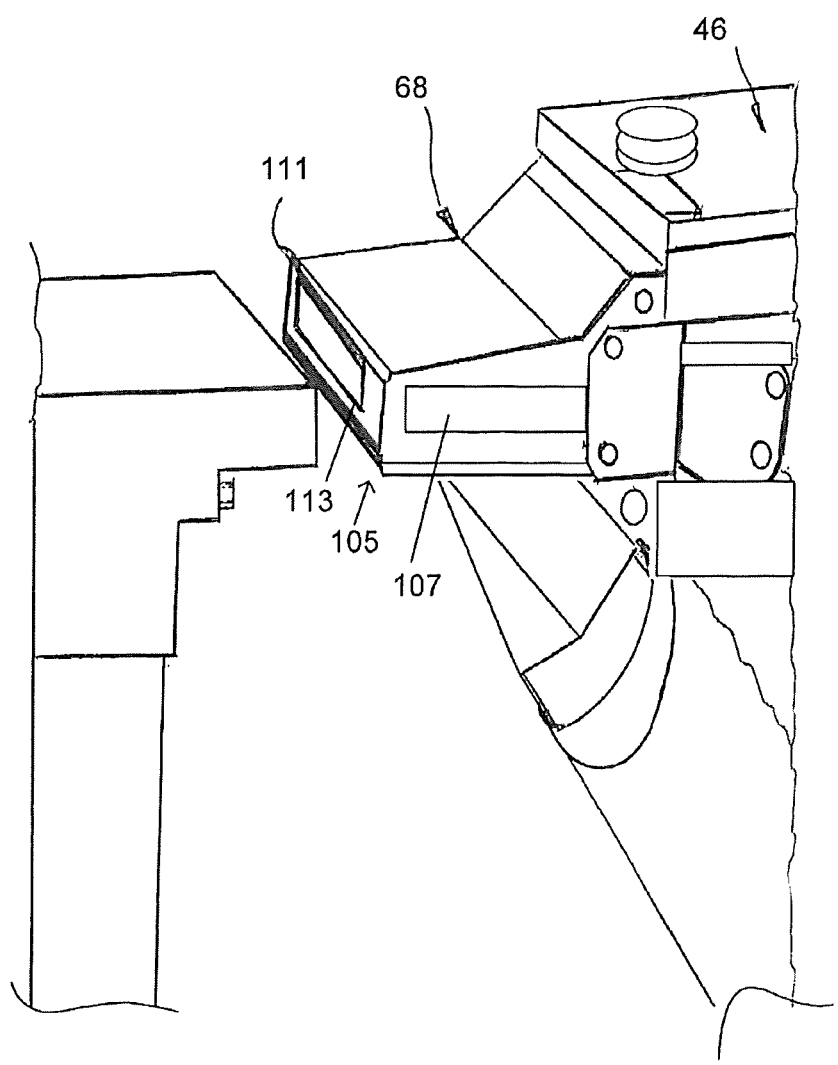
FIG. 7A is a view of the displaceable arm of FIG. 6A provided with a safety mechanism operable to monitor the desired contact between the arm and the front workpiece and indicate the structural integrity of the arm itself.
Figure 7B:
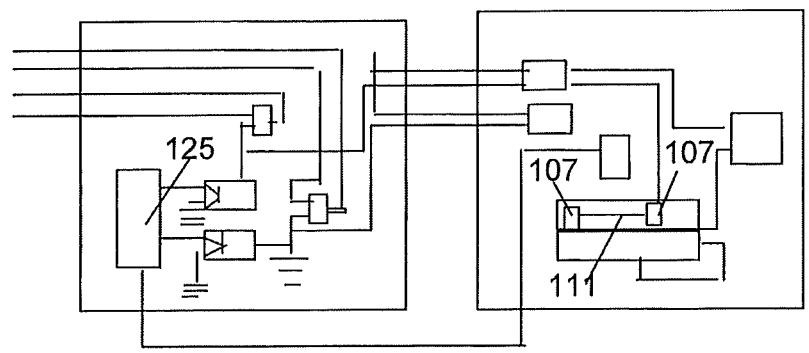
FIG. 7B is an electrical circuitry illustrating the operation of the safety mechanism.
Figure 7C:
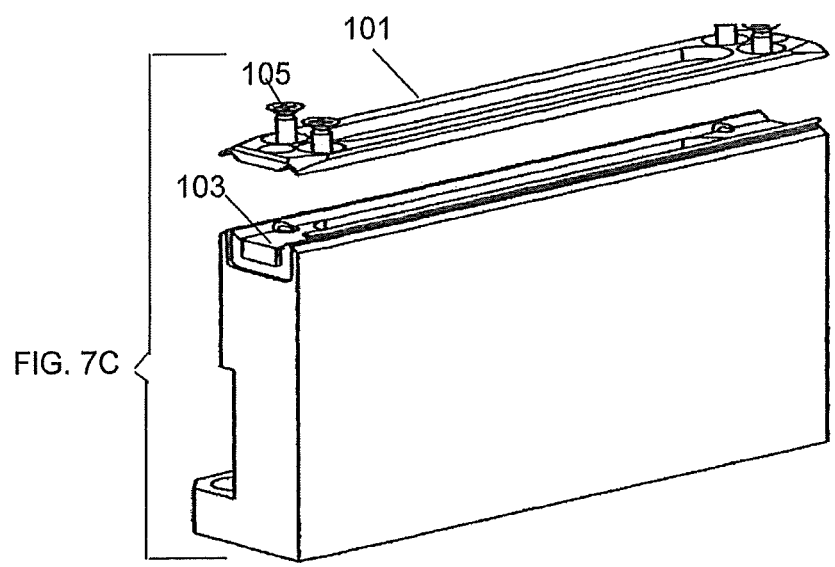
Figure 7D:
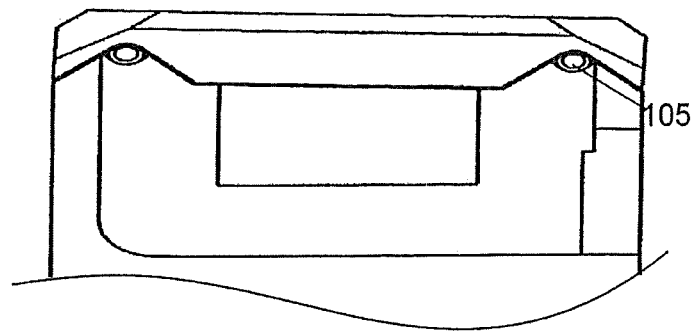

Referring to FIGS. 7A and 7B in addition to FIG. 5B, pressure piece 68 of displaceable arm 46 is provided with a safety mechanism 105 operable to monitor the desired contact between the arm and front workpiece. The mechanism 105 is also configured to control the structural integrity of pressure piece 68.

In particular, mechanism 105 includes two pre-stressed axially displaceable contacts 107 extending along respective sides of pressure piece 68. In the initial prestressed condition, both contact 107 extend beyond the edge 113 (FIG. 7A) of pressure end piece 68 at a predetermined distance. If the front workpiece and arm 46 are correctly positioned, both contacts 107 touch the surface of the workpiece. If, however, the position is not correct, at least one of contacts 107 does not press against the workpiece, laser 16 (FIG. 1) cannot be fired, as explained below.

The electrical circuitry on FIG. 7B includes three components: side contacts 107 and a wire 111 which are electrically connected to one another in series. If at least one of these components does not generate a signal received by microcontroller 125, the circuitry remains open and the controller does not output a control signal to a power source of laser 16, which thus remains inactivated.

The wire 111 is mounted at a short distance from edge 113 (FIG. 7A) of end piece 68 to a closed groove running around the perimeter of end piece 68. If end piece 68 damaged so that wire 111 comes in direct contact with the surface of the front workpiece, the wire easily breaks up and the laser source is not turned on.

Figure 8:
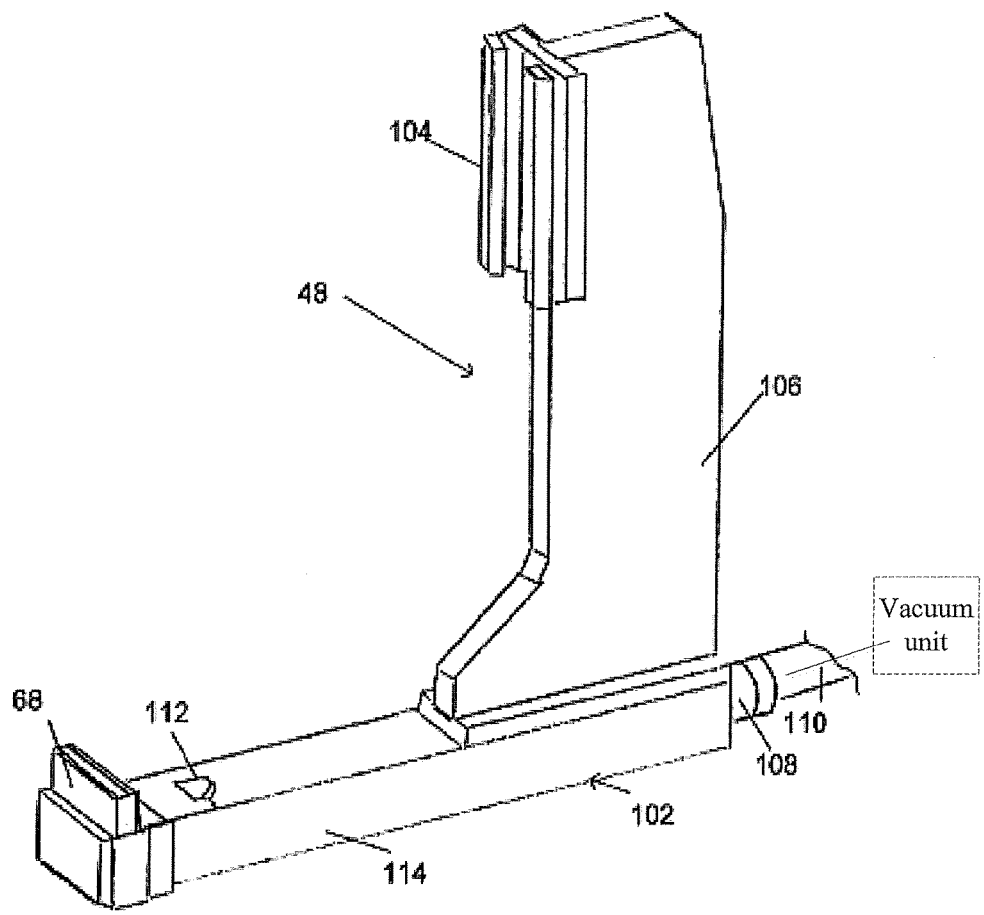
FIG. 8 is an axonometric view of the stationary arm of the disclosed gun.

Referring to FIGS. 8 and 4B, stationary L-shaped arm 48 has a component 106, which extends parallel to longitudinal axis A-A' of gun 12 when arm 48 is mounted to support column 50, while a component 102 extends perpendicular to the same axis. The component 106 is removably mounted to support column 50 (FIG. 4B) by any suitable type of fasteners 104 (FIG. 7). Accordingly, gun 12 can be used with single, displaceable arm 46.

During welding, debris may penetrate into the interior of arm's component 102 through bottomless pressure end piece 68 and, if not removed, the accumulated debris can damage this component and generally negatively affect the quality of a weld. To prevent the accumulation, the hollow interior of component 102 is in fluid communication with an outside pump. The latter may be pump 100 (FIG. 4C) or a different pump operative to create a pressure gradient sufficient for the removal of the debris through a hose 110 which is received by a connector 108. In addition to the pressure-evacuating technique, the bottom of component 102 can be detached for further removal of the accumulated debris.

Figure 9:
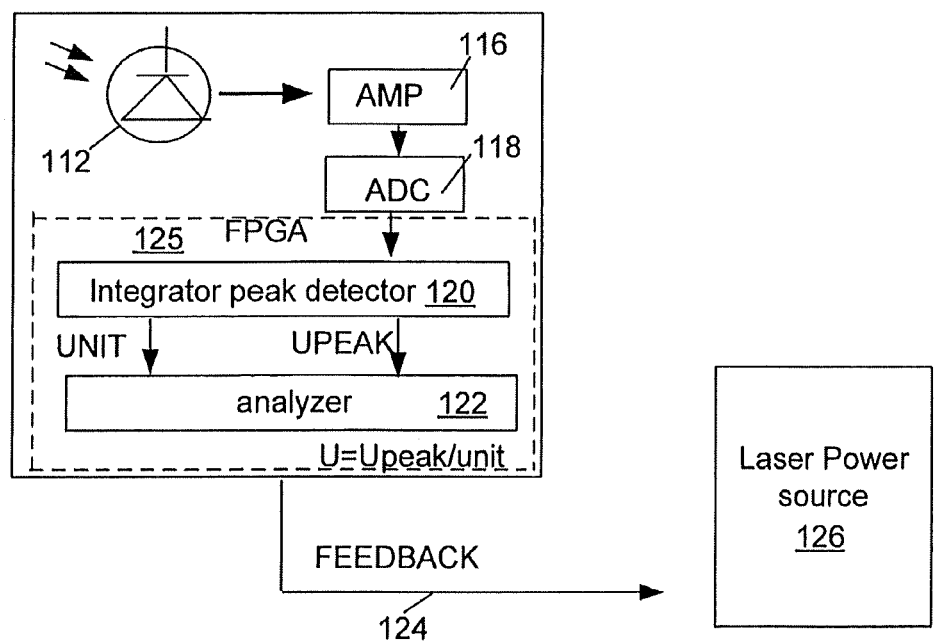
FIG. 9 is a simplified block diagram illustrating the operational principle of the automatic seam disclosed gun.

Referring to FIG. 9 in addition to FIG. 8, the output power of laser 16 (FIG. 1) is continuously controlled while the workpieces are being welded. As optical head 62 (FIG. 4A) moves along a predetermined length while wobbling at a predetermined frequency, a laser beam melts overlaid sheets so as to create a passage which extends through front and rear workpieces. As the beam moves further, molten metal flows back closing up the passage, but not before the passage is traversed by the laser beam. The measured intensity of the penetrated laser beam is indicative of the quality of the weld. If the measured intensity is higher than a reference value, as explained hereinbelow, the passage is too large and the output power of the laser is reduced. Conversely, if the measured intensity is lower than the reference value, the output laser power is increased.

In a particular realization of FIG. 9, a photodetector 112 is mounted in a through-going nest 114 (FIG. 8) which is provided in component 102 of stationary arm 48. The detector 112 senses the radiation, which in the shown configuration is reflected from the bottom of component 102 the interior of which functions as a light trap. The detector 112 generates a signal augmented in an amplifier 116. The reflected light may have higher or lower intensity with the high intensity corresponding to light peaks. Upon being converted in an analog-to-digital converter 118, the average ($V_{av}$) and peak ($V_{peak}$) powers of the signal are determined in micro-controller 125. The controller can be of a type of integrated circuit known as field programmable gate array (FPGA) which can perform a variety of functions, including, for example integrator and peak detector functions 120, and has a lightweight structure. The analyzer 122 processes the determined powers and outputs a control signal corresponding to a Vav to Vpeak ratio. The latter is fed back to a laser power source 126 if the ratio is either smaller or greater than a reference value. In response, the laser beam power may be either increased or decreased so as to have the desired seam. The above-disclosed power control feature may be easily realized by a different configuration. Instead of the interior of the stationary arm, any light trap configuration, provided on the back of the welding zone and, optionally, having its interior isolated from ambient light, can be used in combination with a photodetector. Accordingly, laser 16, integrated in the disclosed single-arm configuration, can be also controlled in accordance with the above-disclosed technique. Furthermore, instead of sensing reflected light, sensor 112 can be positioned to directly detect the incident light.

Figure 10:
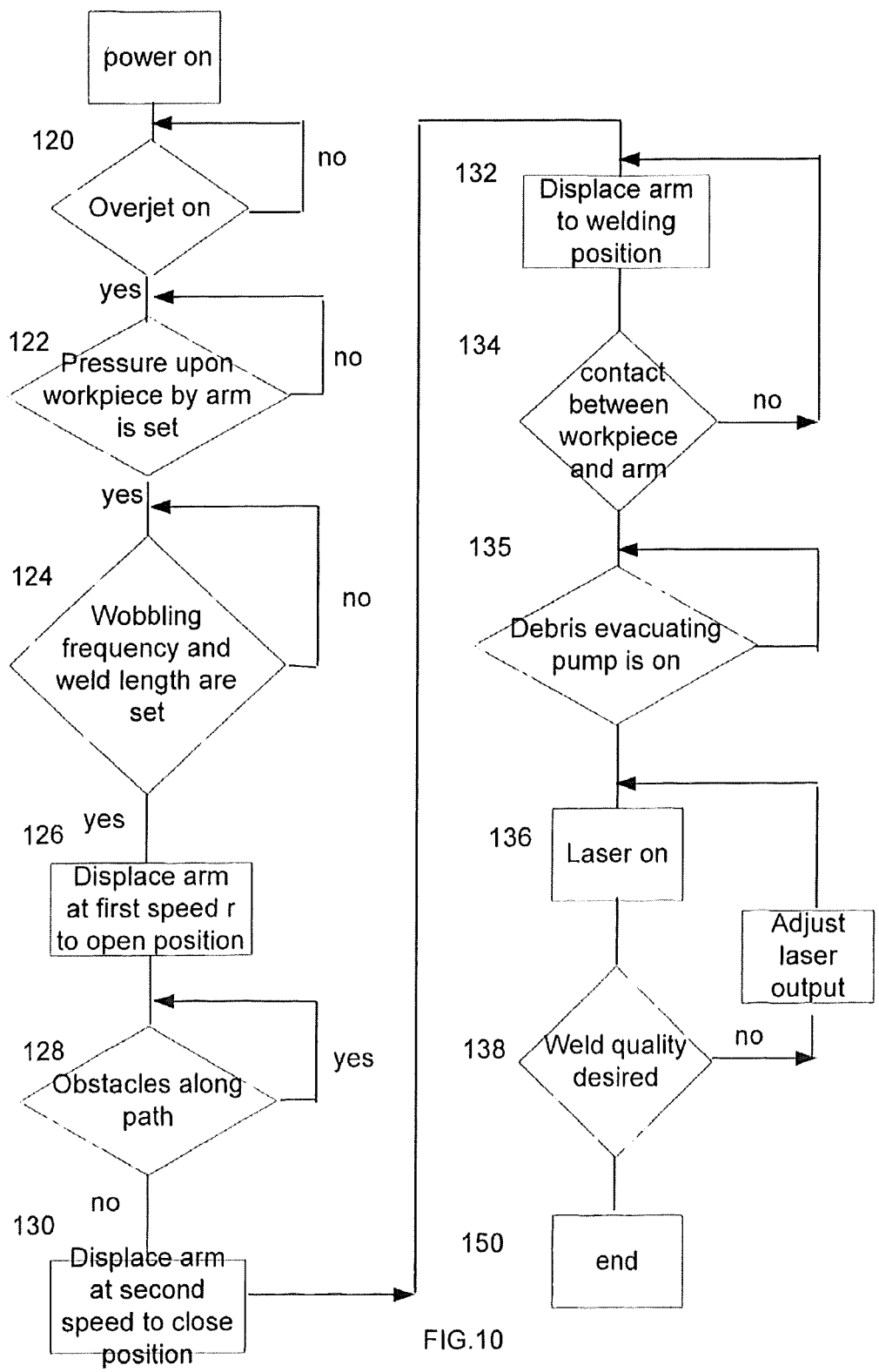
FIG. 10 is a flow chart illustrating the principle of operation of the disclosed hand-maneuverable laser gun.

FIG. 10 illustrates the operation of disclosed gun 12. It is worth noting that all controllers incorporated in a controlling scheme of gun 12 are based on the FPGA platform which considerably decreases the overall weight of gun 12 compared to somewhat similarly configured guns which are based on a programmable logical controller (PLC) platform.

In response to pressing on-button 35 (FIGS. 4A, 4F), the external source of pressurized medium starts operating to provide the overjet within tunnel 82 (FIGS. 6B, 6C) as shown at 120. Simultaneously with or subsequent to the overjet, motor 56 (FIGS. 4B and 5) is actuated unless the desired pressure upon the workpiece, weld length and wobbling frequency are not set, as shown at 122 and 124, respectively. Provided all of the above disclosed steps are completed, motor 56 starts displacing arm 46 from the home position to the open position (FIG. 5B) as illustrated by numeral 126. As arm 46 moves toward the open positions at a relatively high speed, the presence of any obstacles along the path is continuously controlled at 128. A further displacement of arm 46 to the closed position at 130 is provided at a relatively slow speed. Finally, arm 46 is displaced to the welding position so as to provide the desired pressure on the workpiece at 132.

In the welding position, the contact between end pressure piece 68 and the surface of the workpiece is verified as shown at 134. Either after the contact control or somewhere before, pump 10 (FIG. 4D) is actuated to create a pressure gradient evacuating all air streams along with welding debris. Only after all of the above, the laser outputs a beam and a welding operation begins, as indicated by 136. During the welding operation, the quality of the seam is controlled, as disclosed above and indicated here by 138. If necessary the beam's power is adjusted at 140. Once the process is over at 150, all pumps and laser source are turned off which considerably conserves the energy consumption and helps characterize the disclosed gun as an energy saving technology.

The disclosed gun may be configured with the following parameters which are given as an example.

| | |
|---|---|
| Weight | 35 kg |
| Adjustable Clamping Force (Z-hub) | 0.6-3.0 kN |
| Opening Width C-gun | 130 mm |
| Welding Seam Length | max. 40 mm |
| Wobble Amplitude (Wobble) | ±1 mm |
| Frequency (Wobble Frequency) | 3-25 Hz |

-continued

| | |
|---|---|
| Welding Speed | max. 80 mm/s |
| Focal Length | 250 or 300 mm |
| Compressed Air Consumption | 250 l/min at 5 bar |

2.0 Technical Specifications: Laser/Controller

| | |
|---|---|
| Operation Mode | CW, modulated |
| Wavelength | 1070 nm |
| Nominal Output Power | max. 4 kW |
| Spot Size | 0.5 mm |
| Power Consumption | 12 kW (without chiller) |
| Dimensions Controller L × B ×H | 806 × 856 × 1508 mm |
| Weight | 400 kg |

Although shown and disclosed is what is believed to be the most practical and preferred embodiments, it is apparent that departures from the disclosed configurations and methods will suggest themselves to those skilled in the art and may be used without departing from the spirit and scope of the invention. Accordingly, the present invention is not restricted to the particular constructions described and illustrated in regard to, for example, fiber lasers, but should be construed to cohere with all modifications that may fall within the scope of the appended claims.

The invention claimed is:

1. A hand maneuverable laser welding gun for joining two or more overlaid metal pieces, comprising:

an elongated support column extending along a longitudinal axis;

an optical head axially displaceable along the support column and provided with optics which are configured to focus a laser beam along a path through a protective window of the optical head on a welding zone, a first arm mounted to the support column along the path downstream from the protective window and coupled to the optical head to axially move between a home position and a welding position in which the arm presses against one of the metal pieces so as to enclose the welding zone to prevent laser emission from escaping outside the welding zone during welding, the first arm being configured with a hollow housing provided with an inner peripheral surface which defines an elongated tunnel traversed by the laser beam which axially propagates from an upstream to a downstream end of the housing, the housing having:

a recess traversed by a first stream of a pressurized medium which enters the upstream end of the tunnel at a first pressure sufficient to prevent welding debris from reaching the protective window, an inlet traversed opening into the the upstream end at a distance from the recess, the inlet being traversed by a second stream of gaseous medium entering the upstream end of the tunnel at a second pressure which is lower than the first pressure and selected to prevent formation of air vortexes in the tunnel, and a suction outlet provided in the housing and opening into the downstream end of the tunnel, the suction outlet being under a third pressure creating a pressure gradient between the upstream and downstream ends sufficient for the first and second streams axially copropagate through the tunnel along with the laser beam and are extracted from the tunnel through the suction outlet.

2. The laser welding gun of claim 1 further comprising
a second stationary arm detachably coupled to the support column, and
first and second material supporting pressure ends aligned to one another and detachably mounted to respective first and second arms, the pressure ends pressing against respective metal pieces to be welded with a predetermined force during a welding operation with the laser beam.

3. The laser welding gun of claim 2, wherein the stationary arm is configured with first and second components which are coupled together to define an L-shape, the first component of the stationary arm being provided with a fastening unit configured to detachably couple the stationary arm to the column so that the first components extends parallel to the longitudinal axis.

4. The laser welding gun of claim 3, wherein the second component of the stationary arm extends perpendicular to the longitudinal axis in a mounted position of the stationary arm, the second component being configured with an inner surface defining a hollow interior.

5. The laser welding gun of claim 4 further comprising a vacuum unit in fluid communication with a free end of the second component of the stationary arm, the vacuum unit being operable to create a pressure differential within the interior sufficient to remove the welding debris therefrom.

6. The laser welding gun of claim 4 further comprising a photodetector removably nested in the second component of the stationary arm and configured to detect the light beam propagating through the pieces to be welded, wherein an intensity of the reflected light is matched to a reference value so that if the measured intensity does not match the value, a power of the laser beam is adjusted and a quality of the seam is improved.

7. The laser welding gun of claim 4, wherein the stationary arm is configured with a detachable bottom receiving welding debris which are removed therefrom upon displacing the bottom.

8. The laser welding gun of claim 1 further comprising a support plate displaceably mounted to and extending in a plane perpendicular to the longitudinal axis, the optical head and first arm being mounted to the support plate and extending in opposite axial directions therefrom.

9. The laser welding gun of claim 1, wherein the
housing has a frustoconical shape tapering towards the downstream end of the tunnel;
a flange provided with the recess and configured with a peripheral wall which narrows towards the downstream end and axially overlaps an upstream region of the housing; and
a T-shaped tube received in the recess of the flange and extending axially into the housing to overlap the upstream end of the tunnel so as to define a large annular space with the flange and a narrow axial passage with the housing, the annular space and passage being in fluid communication so that the first stream of gaseous medium enters the space and further axially flows through the passage into the upstream end of the tunnel towards the downstream end of the tunnel.

10. The laser welding gun of claim 8 further comprising:
a first actuator operable to displace the support plate along the column;
a second actuator operable to provide a seam with the desired length; and
a third actuator operative to provide the seam with a sinusoid shape, the actuators being movably coupled to the support plate.

11. The laser welding gun of claim 10, wherein the first actuator is operative to linearly displace the support plate among a plurality of spaced sequential positions including:
a home position in which the displaceable arm is spaced from the welding zone at a first distance,
an open position in which the displaceable arm is spaced from the welding zone at a second distance smaller than the first distance;
a closed position with the displaceable aim located between the open position and the welding zone, and
a gripping position in which the displaceable arm presses against the workpiece with a desired force.

12. The laser welding gun of claim 11, wherein the first actuator is operable to displace the support plate between the home and open positions at a linear speed higher than a linear speed of the support plate between the open and closed positions.

13. The laser welding gun of claim 1 further comprising a fiber laser emitting the laser beam having up to a kW-level power.

14. The laser welding gun of claim 1 further comprising a suspension system coupling a housing of the gun to an external guide and configured so that the gun is operable to:
rotate about the longitudinal axis,
rotate about a vertical axis extending transversely to the longitudinal axis,
tilt about a pivot axis extending transversely to the longitudinal and vertical axes, and
move linearly towards and away from the workpieces to be welded.

15. A welding gun for joining two or more metal pieces spaced from one another at a predetermined distance, comprising:
an elongated support column extending along a longitudinal axis;
an optical head axially displaceable along the support column and provided with optics which are configured to focus a laser beam along a path to a welding zone,
a first arm mounted to the support column along the path and movable with the head to a welding position in which the arm presses against a front metal piece in the front of the emission zone with a predetermined force so as to prevent laser emission from escaping outside the welding zone during welding and preserve the predetermined distance between the pieces,
a hollow second arm pressing a rear metal piece in the welding position and having an interior which defines a laser emission trap, the interior being configured to receive light emission, which propagates through the welding zone, and prevent exiting the received emission outside the trap;
a sensor coupled to the trap and operative to detect the emission within the interior; and
a controller operative to match a signal from the sensor with a reference and output a control signal to adjust the force so as to maintain the predetermine distance between the metal pieces.

* * * * *